(12) United States Patent
Wu et al.

(10) Patent No.: US 9,488,865 B2
(45) Date of Patent: Nov. 8, 2016

(54) DISPLAY DEVICE AND METHOD FOR MANUFACTURING THE SAME

(71) Applicant: AU Optronics Corporation, Hsin-Chu (TW)

(72) Inventors: Feng-Chi Wu, Hsin-Chu (TW);
Shi-Ming Ou, Hsin-Chu (TW);
Jen-Chuan Huang, Hsin-Chu (TW);
Chi-Chen Huang, Hsin-Chu (TW);
Po-Chun Chen, Hsin-Chu (TW);
Ren-Mei Tseng, Hsin-Chu (TW);
Ming-Sheng Lai, Hsin-Chu (TW);
Pei-Ling Chiang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 34 days.

(21) Appl. No.: 14/611,517

(22) Filed: Feb. 2, 2015

(65) Prior Publication Data
US 2016/0062184 A1     Mar. 3, 2016

(30) Foreign Application Priority Data

Aug. 26, 2014   (TW) .............................. 103129396 A

(51) Int. Cl.
*G02F 1/1335*     (2006.01)
*G02F 1/1333*     (2006.01)

(52) U.S. Cl.
CPC ... *G02F 1/133608* (2013.01); *G02F 1/133308* (2013.01); *G02F 2001/13332* (2013.01)

(58) Field of Classification Search
CPC .................. G02F 1/133608; G02F 1/133308; G02F 2001/13332
See application file for complete search history.

(56) References Cited

U.S. PATENT DOCUMENTS

| | | | |
|---|---|---|---|
| 6,176,584 B1 | 1/2001 | Best et al. | |
| 8,940,386 B2 * | 1/2015 | Ohtani | H05B 3/84 219/202 |
| 2002/0027636 A1 * | 3/2002 | Yamada | G02F 1/133305 349/155 |
| 2003/0197819 A1 * | 10/2003 | Sunohara | G02F 1/133707 349/113 |
| 2009/0161048 A1 * | 6/2009 | Satake | G02F 1/133305 349/110 |
| 2010/0073593 A1 * | 3/2010 | Sasaki | B29D 11/00 349/58 |
| 2010/0073620 A1 * | 3/2010 | Yamaguchi | G02F 1/133305 349/160 |
| 2011/0043719 A1 * | 2/2011 | Thunhorst | G02F 1/133308 349/58 |
| 2013/0002572 A1 * | 1/2013 | Jin | G02F 1/133305 345/173 |
| 2013/0154911 A1 * | 6/2013 | Chen | G02F 1/134336 345/87 |
| 2013/0321740 A1 * | 12/2013 | An | H05K 5/0217 349/58 |
| 2015/0085220 A1 * | 3/2015 | Chen | G02F 1/133606 349/62 |
| 2015/0168768 A1 * | 6/2015 | Nagatani | G06F 1/1601 349/58 |
| 2015/0295091 A1 * | 10/2015 | Cao | G02F 1/1368 257/43 |

FOREIGN PATENT DOCUMENTS

| | | | |
|---|---|---|---|
| CN | 103852937 | 6/2014 | |
| EP | 2664957 | 11/2013 | |
| TW | 102134621 | * 9/2013 | ........... G02F 1/1333 |

* cited by examiner

*Primary Examiner* — Sang V Nguyen
(74) *Attorney, Agent, or Firm* — WPAT, PC; Justin King

(57) ABSTRACT

A display device includes a display panel and a backlight module. The display panel is bent in a first direction and a second direction perpendicular to the first direction. The backlight module is disposed on one side of the display panel.

17 Claims, 12 Drawing Sheets

DISPLAY DEVICE AND METHOD FOR MANUFACTURING THE SAME

RELATED APPLICATIONS

This application claims priority to Taiwan Application Serial Number 103129396, filed Aug. 26, 2014, which are herein incorporated by reference.

BACKGROUND

1. Technical Field

The present disclosure relates to a display device, and more particularly, to a curved display device and a method of manufacturing such a curved display device.

2. Description of Related Art

With advances in the manufacturing technology for displays, more and more manufacturers are trying to manufacture curved displays to achieve a better viewing quality. For example, a TV screen can be manufactured to be concave. Therefore, when a user is watching the TV, differences in the distances between the eyes of the user and each part of the screen are reduced, and moreover, the angle between each part of the screen and the corresponding line of sight is at or close to a right angle, which is the best angle to view an image on a screen. In addition, a curved screen has a larger display surface than a flat screen with the same width, such that the user can watch a larger image.

A curved display can be made using an actively luminous organic light-emitting diode display or a passively luminous liquid crystal panel. When a liquid crystal panel is used to manufacturing a curved display, the liquid crystal panel is bent utilizing external forces to form a curved surface. However, a stress-optical effect may occur if uneven forces are applied to the display panel. Specifically, because the vertical stress and horizontal stress in the display panel are different, the phase retardation of the vertical polarization or the horizontal polarization of polarized light is generated, leading to a slight phase rotation of the polarized light passing through the display panel. Therefore, a polarizer can not entirely filter out light, and leakage of light in a dark state of the liquid crystal display occurs. Since stresses in different parts of the display panel are not even, the magnitudes of light leakage in different parts of the display panel are different, such that mura is generated.

SUMMARY

This disclosure provides a display device to reduce mura in a dark state of a display panel by bending the display panel in a first direction and a second direction perpendicular to the first direction.

In one aspect of the disclosure, a display device is provided. The display device includes a display panel and a backlight module. The display panel is bent in a first direction and a second direction which is perpendicular to the first direction. The backlight module is disposed on one side of the display panel.

In one or more specific embodiments, the display panel is bent toward the backlight module in the first direction and the second direction.

In one or more embodiments, display panel has a long edge and a short edge, the long edge has a length Lx and a maximum deflection Dx, the short edge has a length Ly and a maximum deflection Dy, and the display panel satisfies the following relation:

$$0 < (D_y/L_y)/(D_x/L_x) < 0.512.$$

In one or more specific embodiments, the display panel has a long edge and a short edge, the long edge has a length Lx and a maximum deflection Dx, the short edge has a length Ly and a maximum deflection Dy, and the display panel satisfies the following relation:

$$0.074 < (D_y/L_y)/(D_x/L_x) < 0.182.$$

In one or more specific embodiments, the display panel has a long edge and a short edge, the long edge has a length Lx and a maximum deflection Dx, the short edge has a length Ly and a maximum deflection Dy, and the display panel satisfies the following relation:

$$0.082 < (D_y/L_y)/(D_x/L_x) < 0.165.$$

In one or more specific embodiments, the backlight module has a plurality of corner bearing surfaces and a plurality of edge bearing surfaces. The corner bearing surfaces protrude from the backlight module more than the edge bearing surfaces. The display panel has a plurality of edges. Every adjacent two of the edges connecting to each other form a corner, and the corners of the display panel are respectively disposed on the corner bearing surfaces. The display device further includes a front bezel and at least one abutment member. The front bezel is disposed on one side of the display panel opposite to the backlight module, and the front bezel is fixed to the backlight module. The abutment member is disposed between the front bezel and the display panel and at least presses central parts of the edges to force the central parts of the edges to be disposed on the edge bearing surfaces, such that the display panel is bent toward the backlight module in the first direction and the second direction.

In one or more specific embodiments, the backlight module has a concave surface facing the display panel, and the corner bearing surfaces and the edge bearing surfaces are parts of the concave surface.

In one or more specific embodiments, the backlight module has a plane facing the display panel, and the edge bearing surfaces are parts of the plane. The backlight module further includes a plurality of convex structures disposed between the plane of the backlight module and the display panel and respectively abutting against the corners of the display panel, and top surfaces of the convex structures abutting against the corners are respectively the corner bearing surfaces.

In one or more specific embodiments, the display panel has a pair of long edges and a pair of short edges. A number of the abutment members is at least two, and the abutment members are respectively disposed on the long edges and the short edges. A length of the abutment members disposed on the long edges is smaller than about one third of a length of the long edges, and a length of the abutment members disposed on the short edges is smaller than about one third of a length of the short edges.

In another aspect of the disclosure, a method for manufacturing a display device is provided. The method includes providing a display panel and a backlight module, and assembling the display panel on the backlight module, such that the display panel is bent in a first direction and a second direction perpendicular to the first direction.

In one or more specific embodiments, the backlight module has a plurality of corner bearing surfaces and a plurality of edge bearing surfaces. The corner bearing surfaces protrude from the backlight module more than the edge bearing surfaces. The display panel has a plurality of edges. Every adjacent two of the edges connect to each other form a corner. Assembling the display panel of the backlight module further includes respectively disposing the corners of the display panel on the corner bearing surface; disposing a front bezel and at least one abutment member on one side of the display panel opposite to the backlight module, in which the abutment member is disposed between the front bezel and the display panel and on central parts of the edges of the display panel; and fixing the front bezel to the backlight module, such that the abutment member at least presses the central parts of the edges to force the central parts of the edges to be disposed on the edge bearing surfaces and the display panel is bent toward the backlight module in the first direction and the second direction.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1A:
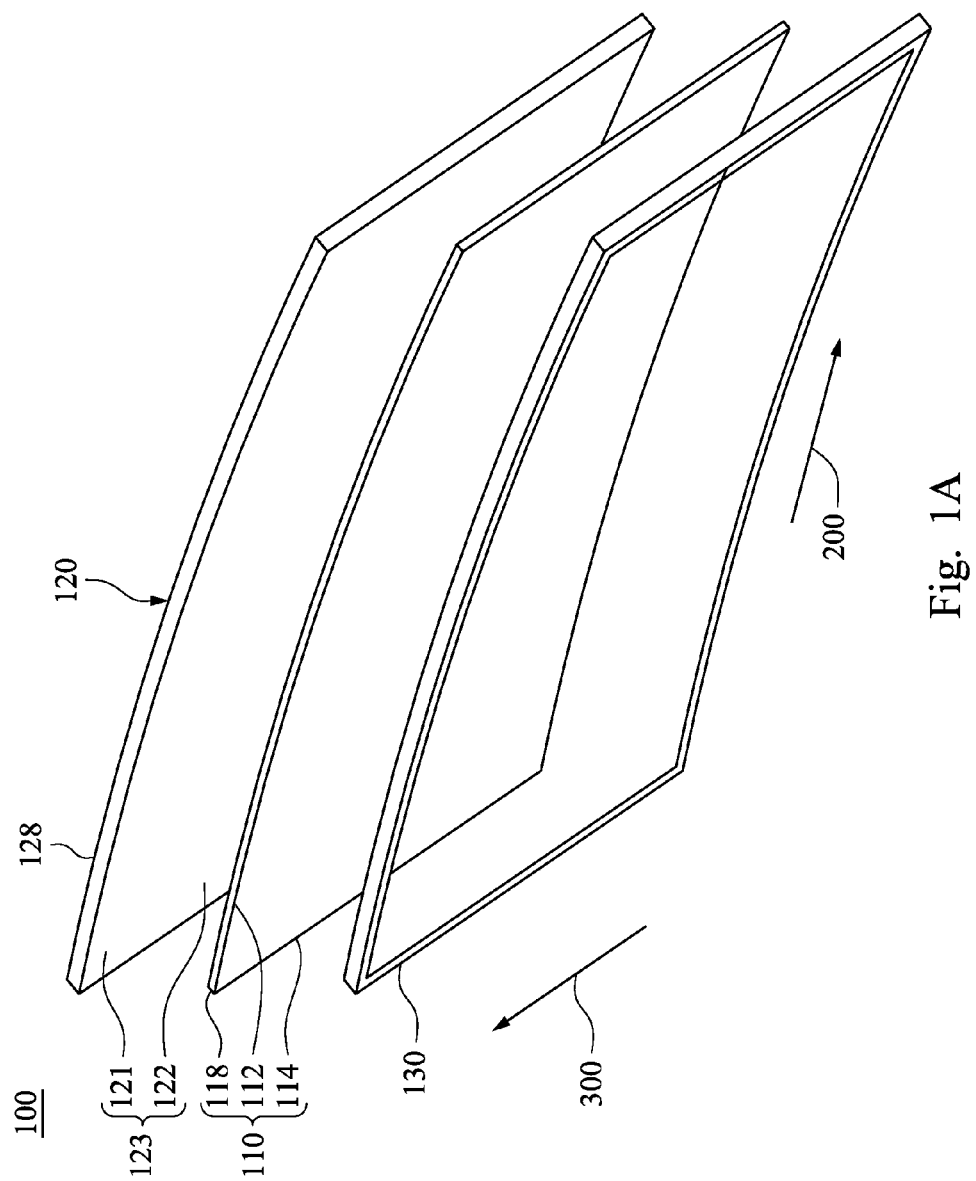
FIG. 1A is a schematic exploded view of a display device according to one embodiment of this invention.
Figure 1B:
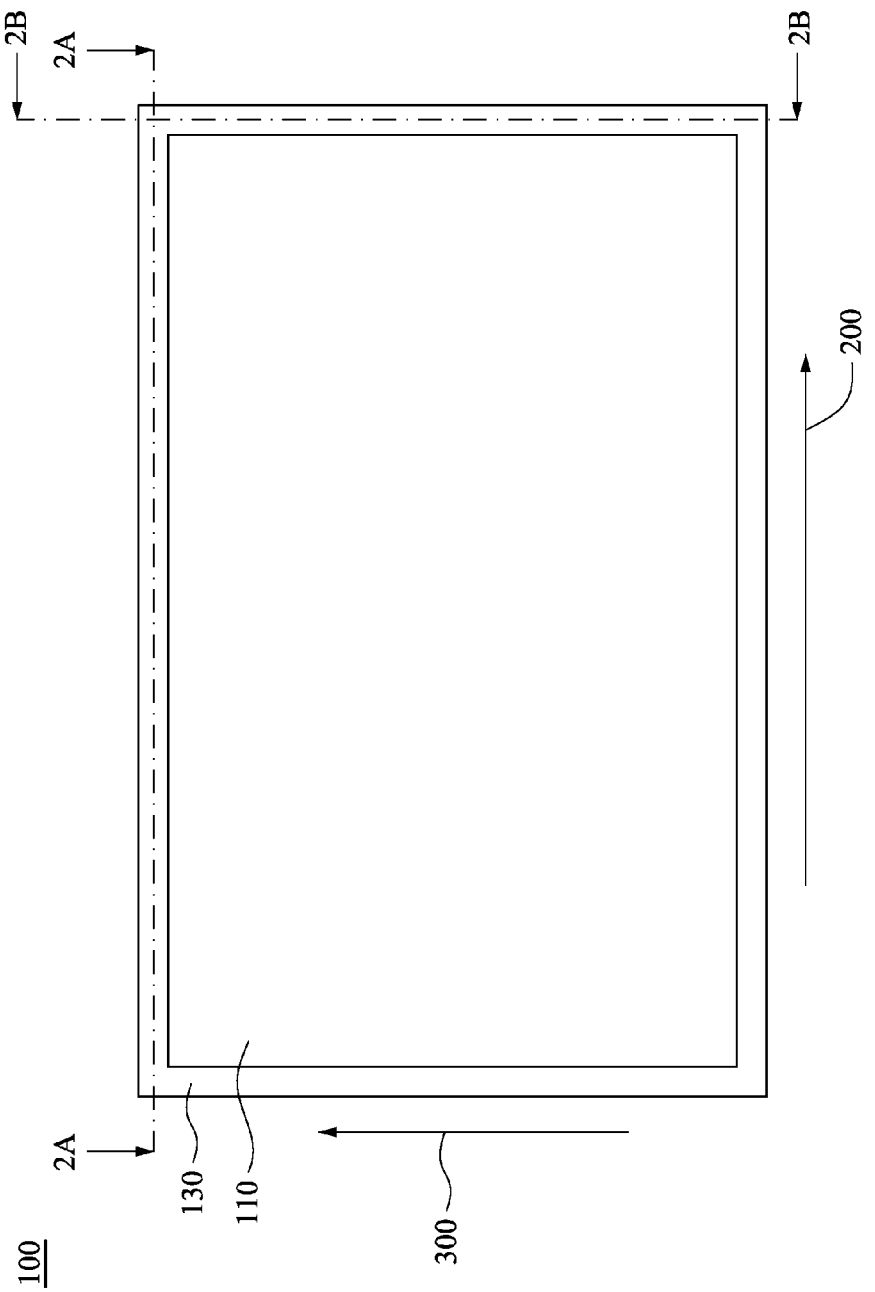
FIG. 1B is a schematic front view of the display device of FIG. 1A.

FIG. 1A is a schematic exploded view of a display device 100 according to one embodiment of this invention. FIG. 1B is a schematic front view of the display device 100 of FIG. 1A. A display device 100 is provided. Specifically, the display device 100 is a curved display implemented using a liquid crystal display panel.

Figure 2A:
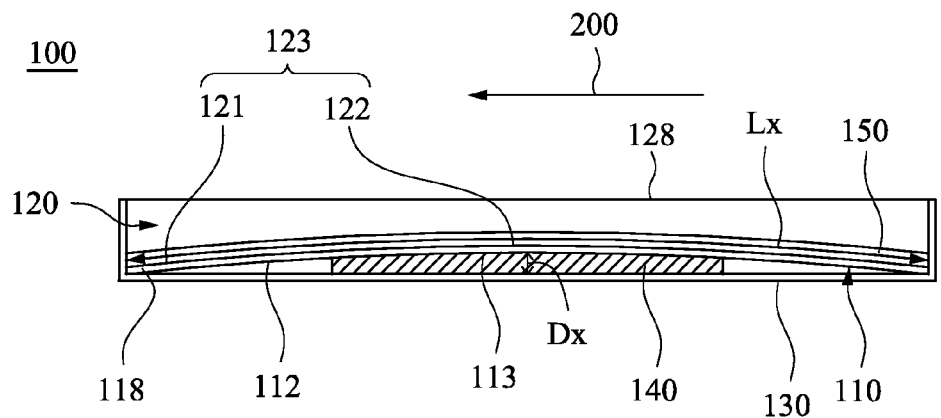
FIG. 2A is a cross-sectional view taken along line 2A-2A of FIG. 1B.
Figure 2B:
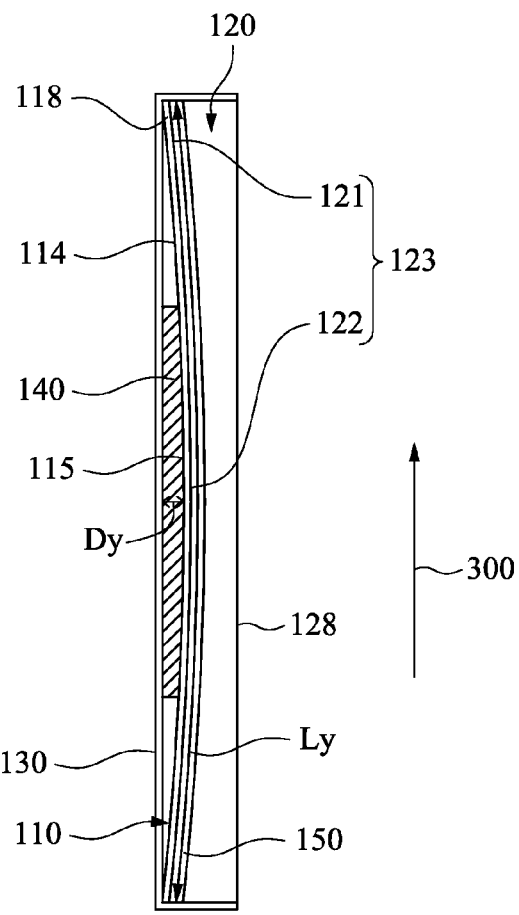
FIG. 2B is a cross-sectional view taken along line 2B-2B of FIG. 1B.

FIG. 2A is a cross-sectional view taken along line 2A-2A of FIG. 1B. FIG. 2B is a cross-sectional view taken along line 2B-2B of FIG. 1B. As shown in FIGS. 1A, 1B, 2A, and 2B, the display device 100 includes a display panel 110 and a backlight module 120. The display panel 110 is bent in a first direction 200, which is the horizontal direction in this embodiment, and a second direction 300 perpendicular to the first direction 200, which is the vertical direction in this embodiment. The backlight module 120 is disposed on one side of the display panel 110. The first direction 200 may be, for example, a direction parallel to long edges of the display device 100, and the second direction 300 may be, for example, a direction parallel to short edges of the display device 100.

Specifically, the display panel 110 is a liquid crystal display panel, and the display panel 110 is bent toward the backlight module 120 in the first direction 200 and the second direction 300.

The backlight module 120 has a plurality of corner bearing surfaces 121, a plurality of edge bearing surfaces 122, and a bottom surface 128. The corner bearing surfaces 121 protrude from the backlight module 120 more than the edge bearing surfaces 122, and the bottom surface 128 is formed as a plane. In other words, distances between the corner bearing surfaces 121 and the bottom surface 128 are larger than distances between the edge bearing surfaces 122 and the bottom surface 128.

The display panel 110 has a plurality of edges. Every adjacent two of the edges connect to each other form a corner 118. Specifically, the display panel 110 has a pair of long edges 112 and a pair of short edges 114, and the long edges 112 and the short edges 114 connect to each other form the corners 118. The corners 118 of the display panel 110 are respectively disposed on the corner bearing surfaces 121.

The display panel 110 is a liquid crystal display panel, and therefore, is planar when no external forces are applied thereto. The display device 100 has a configuration described below, and in this configuration, the display panel 110 is bent by external forces to form a curved surface.

The display device 100 further includes a front bezel 130 and at least one abutment member 140. The front bezel 130 is disposed on one side of the display panel 110 opposite to the backlight module 120, and the front bezel 130 is fixed to the backlight module 120. The abutment member 140 is disposed between the front bezel 130 and the display panel 110 and at least presses central parts of the edges 112, 114 of the display panel 110 to force the central parts of the edges 112, 114 of the display panel 110 to be disposed on the edge bearing surfaces 122 of the backlight module 120, such that the display panel 110 is bent toward the backlight module 120 in the first direction 200 and the second direction 300. Specifically, a number of the abutment members 140 is at least two, and the abutment members 140 are respectively disposed on the long edges 112 and the short edges 114. The abutment members 140 at least press central parts 113 of the long edges 112 and central parts 115 of the short edges 114 to force the central parts 113 of the long edges 112 and the central parts 114 of the short edges 114 to be disposed on the edge bearing surfaces 122, such that the display panel 110 is bent toward the backlight module 120 in the first direction 200 and the second direction 300. In other words, distances between the corners 118 of the display panel 110 and the bottom surface 128 of the backlight module 120 are larger than distances between the central parts 113, 115 of the edges 112, 114 of the display panel 110 and the bottom surface 128 of the backlight module 120.

Specifically, the backlight module 120 has a concave surface 123 facing the display panel 110, and the corner bearing surfaces 121 and the edge bearing surfaces 122 are parts of the concave surface 123.

By bending the display panel 110 in the first direction 200 and the second direction 300 perpendicular to the first direction 200, the magnitudes of the vertical stress and the horizontal stress in the display panel 110 are made closer to each other. Therefore, the magnitudes of the phase retardations in the vertical direction and the horizontal direction, which are associated with the stress-optical effect, may be about the same, so as to reduce the phase rotation of polarized light passing through the display panel 110. Therefore, leakage of light in a dark state of the display panel 110 due to incomplete filtering of the polarizer is reduced, and mura generated in a dark state of the display panel 110 is lessened.

Specifically, if the long edge 112 has a length Lx and a maximum deflection Dx, and the short edge 114 has a length Ly and a maximum deflection Dy, the display panel 110 satisfies the following relation:

$$0<(Dy/Ly)/(Dx/Lx)<0.512.$$

Moreover, the display panel 110 may further satisfy the following relation:

$$0.074<(Dy/Ly)/(Dx/Lx)<0.182.$$

Additionally, the display panel may further satisfy the following relation:

$$0.082<(Dy/Ly)/(Dx/Lx)<0.165.$$

For the long edges 112 of the display panel 110, the maximum deflection Dx may be defined as a maximum vertical distance between a straight line connecting both ends of any of the long edges 112 of the display panel 110 and the bent long edge 112 of the display panel 110. For the short edges 114 of the display panel 110, the maximum deflection Dy may be defined as a maximum vertical distance between a straight line connecting both ends of any of the short edges 114 of the display panel 110 and the bent short edge 114 of the display panel 110.

The length Lx of the long edge 112 may be the distance between two ends of the long edge 112 of the display panel 110. The length Ly of the short edge 114 may be the distance between two ends of the short edge 114 of the display panel 110.

By bending the display panel 110 in the first direction 200 and the second direction 300 to satisfy the aforementioned relations, the magnitudes of the vertical stress and the horizontal stress in the display panel 110 become additionally closer, and mura generated in a dark state of the display panel 110 is further lessened.

The abutment members 140 may be foam padding pieces. People having ordinary skill in the art can make proper modifications to the abutment members 140 depending on the actual application.

The front bezel 130 may be a metal frame (for example, an iron frame). People having ordinary skill in the art can make proper modifications to the front bezel 130 depending on the actual application.

The display device 100 may further include a buffer sheet 150. The buffer sheet 150 is disposed between the display panel 110 and the concave surface 123 of the backlight module 120 for buffering forces applied to the display panel 110 by the concave surface 123, so as to prevent damage to the display panel 110.

The material of the buffer sheet 150 may be rubber. Embodiments of this disclosure are not limited thereto. People having ordinary skill in the art can make proper modifications to the buffer sheet 150 depending on the actual application.

Figure 3A:
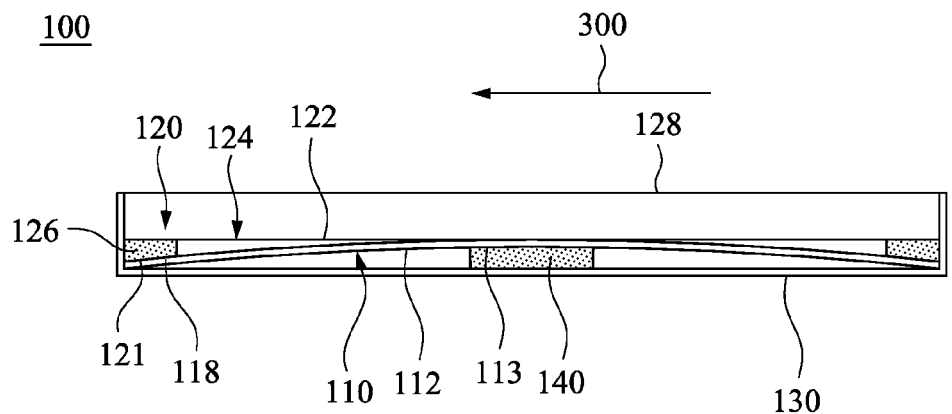
FIG. 3A is a cross-sectional view of the display device according to another embodiment of this invention, in which the position of the cross section is the same as the position of the cross section in FIG. 2A.
Figure 3B:
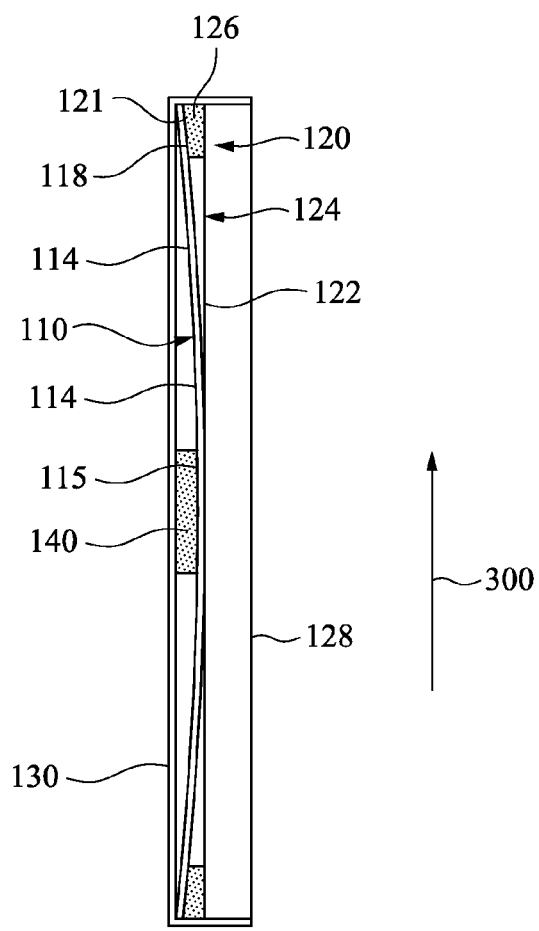
FIG. 3B is a cross-sectional view of the display device of FIG. 3A, in which the position of the cross section is the same as the position of the cross section in FIG. 2B.

FIG. 3A is a cross-sectional view of the display device 100 according to another embodiment of this invention, in which the position of the cross section is the same as the position of the cross section in FIG. 2A. FIG. 3B is a cross-sectional view of the display device 100 of FIG. 3A, in which the position of the cross section is the same as the position of the cross section in FIG. 2B. With reference to FIGS. 3A and 3B, the display panel 100 may have the configuration described below, and in this configuration, the display panel 110 is bent by external forces to form a curved surface. The display device 100 is similar to the aforementioned embodiment, so only the differences are described below.

The backlight module 120 has a plane 124 facing the display panel 110, and the edge bearing surfaces 122 are parts of the plane 124. The backlight module 120 further includes a plurality of convex structures 126. The convex structures 126 are disposed between the plane 124 and the display panel 110 and respectively abut against the corners 118 of the display panel 110. Surfaces of the convex structures 126 abutting against the corners 118 are respectively the corner bearing surfaces 121.

The material of the abutment members 140 may be rubber. People having ordinary skill in the art can make proper modifications to the abutment members 140 depending on the actual application.

In addition, the length of the abutment members 140 disposed on the long edges 112 is smaller than about one third of the length of the long edges 112, and the length of the abutment members 140 disposed on the short edges 114 is smaller than about one third of the length of the short edges 114.

The material of the convex structures 126 may be rubber. People having ordinary skill in the art can make proper modifications to the convex structures 126 depending on the actual application.

Embodiments of this disclosure are not limited to the configuration described above. The display device 100 may have other configurations different from the aforementioned embodiments in FIGS. 2A, 2B, 3A, and 3B, such that the display panel 110 is bent by external forces to form a curved surface.

With reference to FIGS. 1A, 2A, and 2B, a method for manufacturing the display device 100 is provided. The method includes a number of operations described below. First, the display panel 110 and the backlight module 120 are provided. Subsequently, the display panel 110 is assembled on the backlight module 120, such that the display panel 110 is bent in the first direction 200 and the second direction 300 perpendicular to the first direction 200.

Specifically, the backlight module 120 has a plurality of corner bearing surfaces 121 and a plurality of edge bearing surfaces 122. The corner bearing surfaces 121 protrude from the backlight module 120 more than the edge bearing surfaces 122. The display panel 110 has a plurality of edges (specifically, a pair of long edges and a pair of short edges). Every adjacent two of the edges connect to each other form a corner 118.

The operation of assembling the display panel 110 on the backlight module 120 further includes the detailed operations described below. First, the corners 118 of the display panel 110 are respectively disposed on the corner bearing surface 121. Next, the front bezel 130 and at least one abutment member 140 are disposed on one side of the display panel 110 opposite to the backlight module 120, in which the abutment member 140 is disposed between the front bezel 130 and the display panel 110 and on central parts of the edges of the display panel 110 (specifically, the central parts 113 of long edges 112 and the central parts 115 of short edges 114). Finally, the front bezel 130 is fixed to the backlight module 120, such that the abutment member 140 at least presses the central parts of the edges to force the central parts of the edges to be disposed on the edge bearing surfaces 122 and the display panel 110 is bent toward the backlight module 120 in the first direction 200 and the second direction 300.

The method for manufacturing the display device 100 further includes the operations described below. Before the display device 110 is assembled on the backlight module 120, a buffer sheet 150 is disposed on the concave surface 123 of the backlight module 120.

Various working examples are disclosed below to show that the display device 100 of the aforementioned embodiments indeed provides the required performance. Various aspects of the aforementioned embodiments will not be repeated in the following, and only what needs to be further defined will be supplemented.

FIGS. 4A to 4E are graphs illustrating maximum deflection of the short edges 114 to maximum light leakage when the curvature of the long edges 112 of the display device 100 of FIG. 1A is fixed according to different working examples of this invention. The length of the diagonal of the display region of the display device 100 is 55 inches, and the aspect ratio of the lengths of the long edges 112 and short edges 114 of the display device 100 is 16:9. The maximum light leakage represents the ratio of the luminous intensity of the point with the largest brightness on the display panel 110 in a dark state of the display panel 110 and the maximum luminous intensity of each point on the display panel 110. In addition, because the length of the short edges 114 is fixed, the horizontal coordinate can represent the magnitude of the curvature of short edges 114.

Figure 4A:
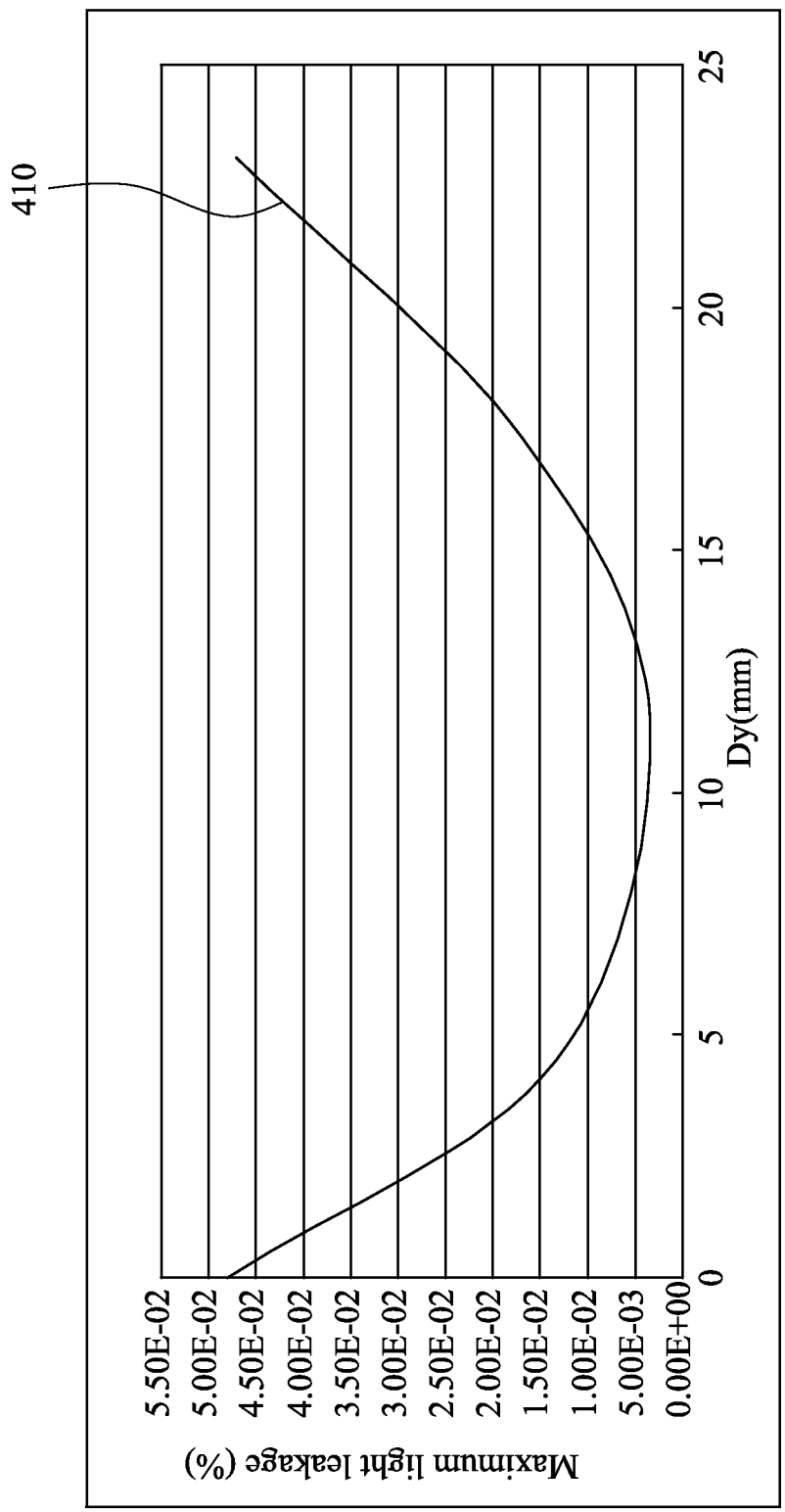
FIGS. 4A to 4E are graphs illustrating maximum deflection of short edges to maximum light leakage when the curvature of long edges of the display device of FIG. 1A is fixed according to different working examples of this invention.

As shown in FIG. 4A, a curve 410 illustrates the relation of the maximum deflection Dy of the short edges 114 and the maximum light leakage of the display device 100, in which the length of the long edges 112 of the display device 100 is 1000 mm. The maximum light leakage of the display device 100 becomes smaller as the maximum deflection Dy becomes larger. When the maximum deflection Dy is about 12 mm, the maximum light leakage of the display device 100 is the smallest. When the maximum deflection Dy is in the range from 0 mm to 23 mm, the maximum light leakage of the display device 100 is lessened. In other words, if the maximum deflection Dy is in the range of 1.9 times of the maximum deflection Dy with the least maximum light leakage (that is, 12 mm), the light leakage of display device 100 is lessened.

Figure 4B:
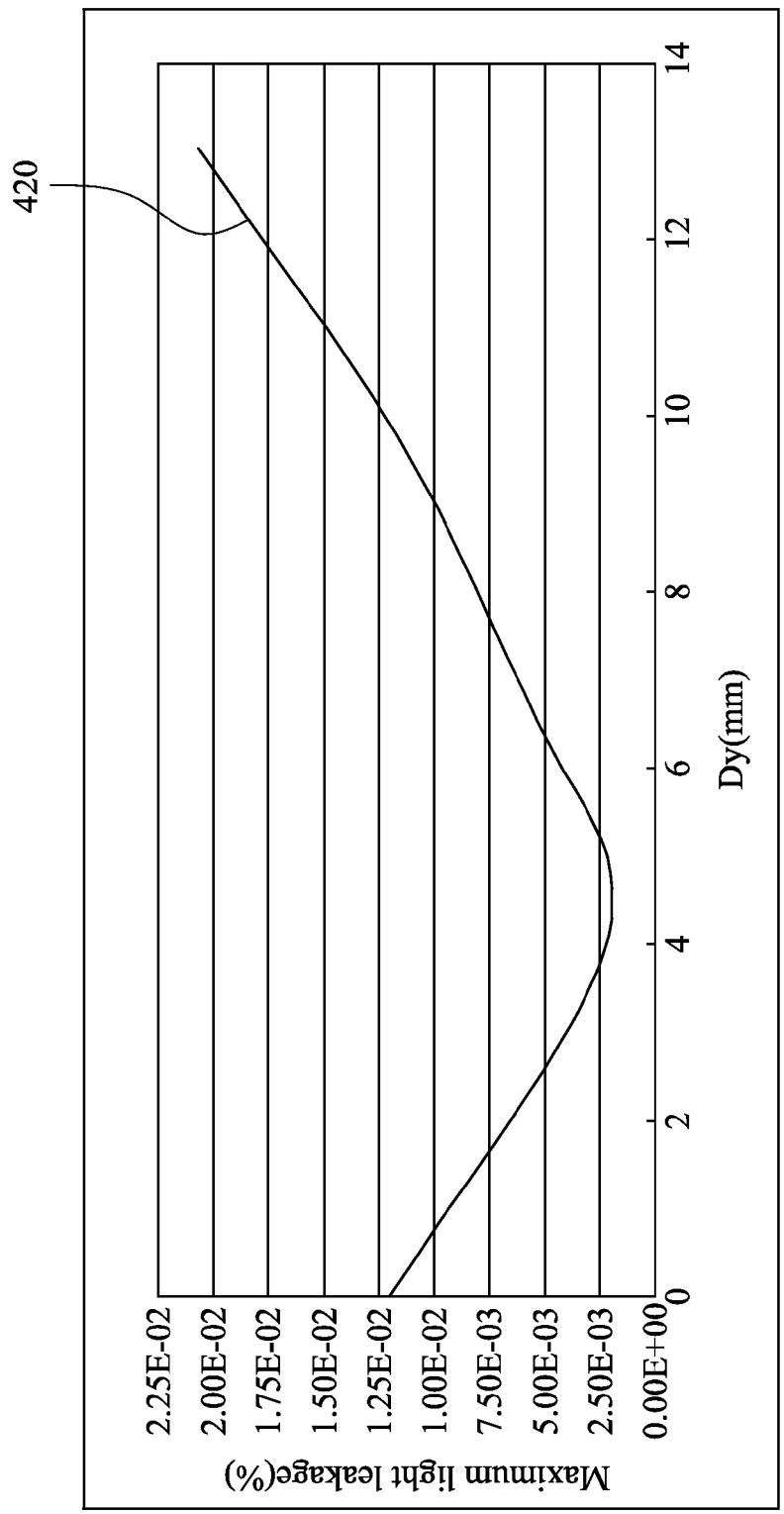

As shown in FIG. 4B, a curve 420 illustrates the relation of the maximum deflection Dy of the short edges 114 and the maximum light leakage of the display device 100, in which the length of the long edges 112 of the display device 100 is 2000 mm. The maximum light leakage of the display device 100 becomes smaller as the maximum deflection Dy becomes larger. When the maximum deflection Dy is about 4.3 mm, the maximum light leakage of the display device 100 is the smallest. When the maximum deflection Dy is in the range from 0 mm to 10 mm, the maximum light leakage of the display device 100 is lessened. In other words, if the maximum deflection Dy is in the range of 2.3 times of the maximum deflection Dy with the least maximum light leakage (that is, 4.3 mm), the light leakage of display device 100 is lessened.

Figure 4C:
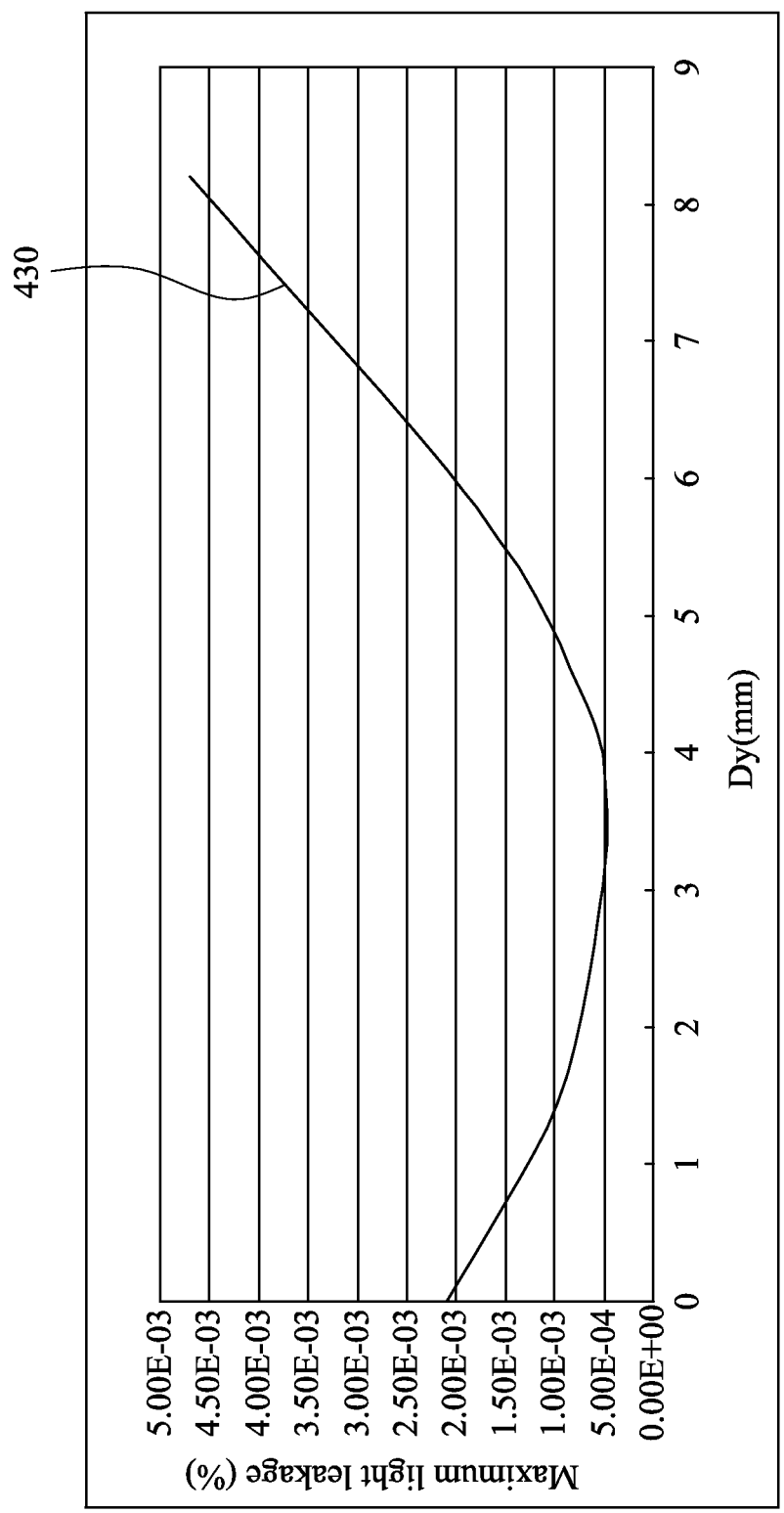

As shown in FIG. 4C, a curve 430 illustrates the relation of the maximum deflection Dy of the short edges 114 and the maximum light leakage of the display device 100, in which the length of the long edges 112 of the display device 100 is 4200 mm. The maximum light leakage of the display device 100 becomes smaller as the maximum deflection Dy becomes larger. When the maximum deflection Dy is about 3.6 mm, the maximum light leakage of the display device 100 is the smallest. When the maximum deflection Dy is in the range from 0 mm to 6.1 mm, the maximum light leakage of the display device 100 is lessened. In other words, if the maximum deflection Dy is in the range of 1.7 times of the maximum deflection Dy with the least maximum light leakage (that is, 3.6 mm), the light leakage of display device 100 is lessened.

Figure 4D:
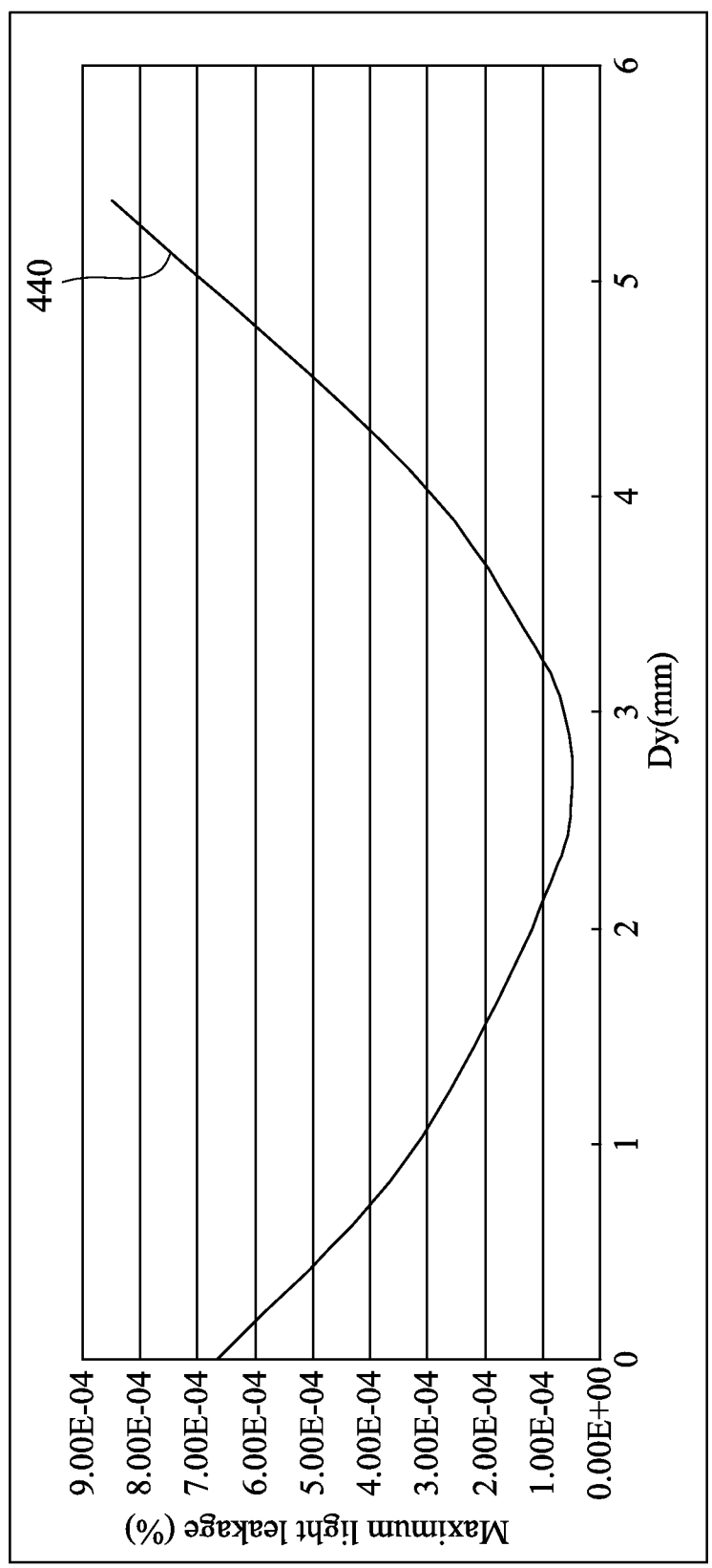

As shown in FIG. 4D, a curve 440 illustrates the relation of the maximum deflection Dy of the short edges 114 and the maximum light leakage of the display device 100, in which the length of the long edges 112 of the display device 100 is 6600 mm. The maximum light leakage of the display device 100 becomes smaller as the maximum deflection Dy becomes larger. When the maximum deflection Dy is about 2.7 mm, the maximum light leakage of the display device 100 is the smallest. When the maximum deflection Dy is in the range from 0 mm to 5.2 mm, the maximum light leakage of the display device 100 is lessened. In other words, if the maximum deflection Dy is in the range of 1.9 times of the maximum deflection Dy with the least maximum light leakage (that is, 2.7 mm), the light leakage of display device 100 is lessened.

Figure 4E:
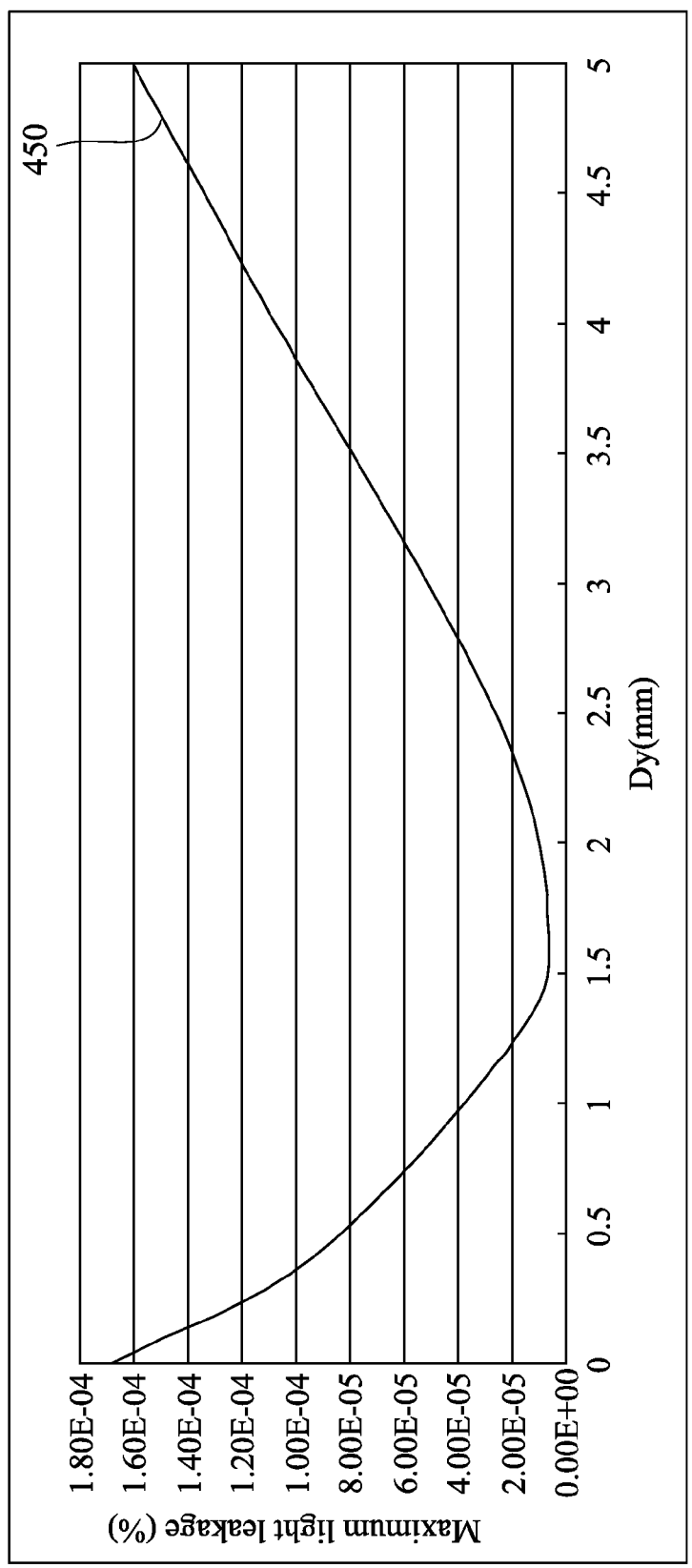

As shown in FIG. 4E, a curve 450 illustrates the relation of the maximum deflection Dy of the short edges 114 and the maximum light leakage of the display device 100, in which the length of the long edges 112 of the display device 100 is 10000 mm. The maximum light leakage of the display device 100 becomes smaller as the maximum deflection Dy becomes larger. When the maximum deflection Dy is about 1.6 mm, the maximum light leakage of the display device 100 is the smallest. When the maximum deflection Dy is in the range from 0 mm to 5 mm, the maximum light leakage of the display device 100 is lessened. In other words, if the maximum deflection Dy is in the range of 3.1 times of the maximum deflection Dy with the least maximum light leakage (that is, 1.6 mm), the light leakage of display device 100 is lessened.

Figure 5:
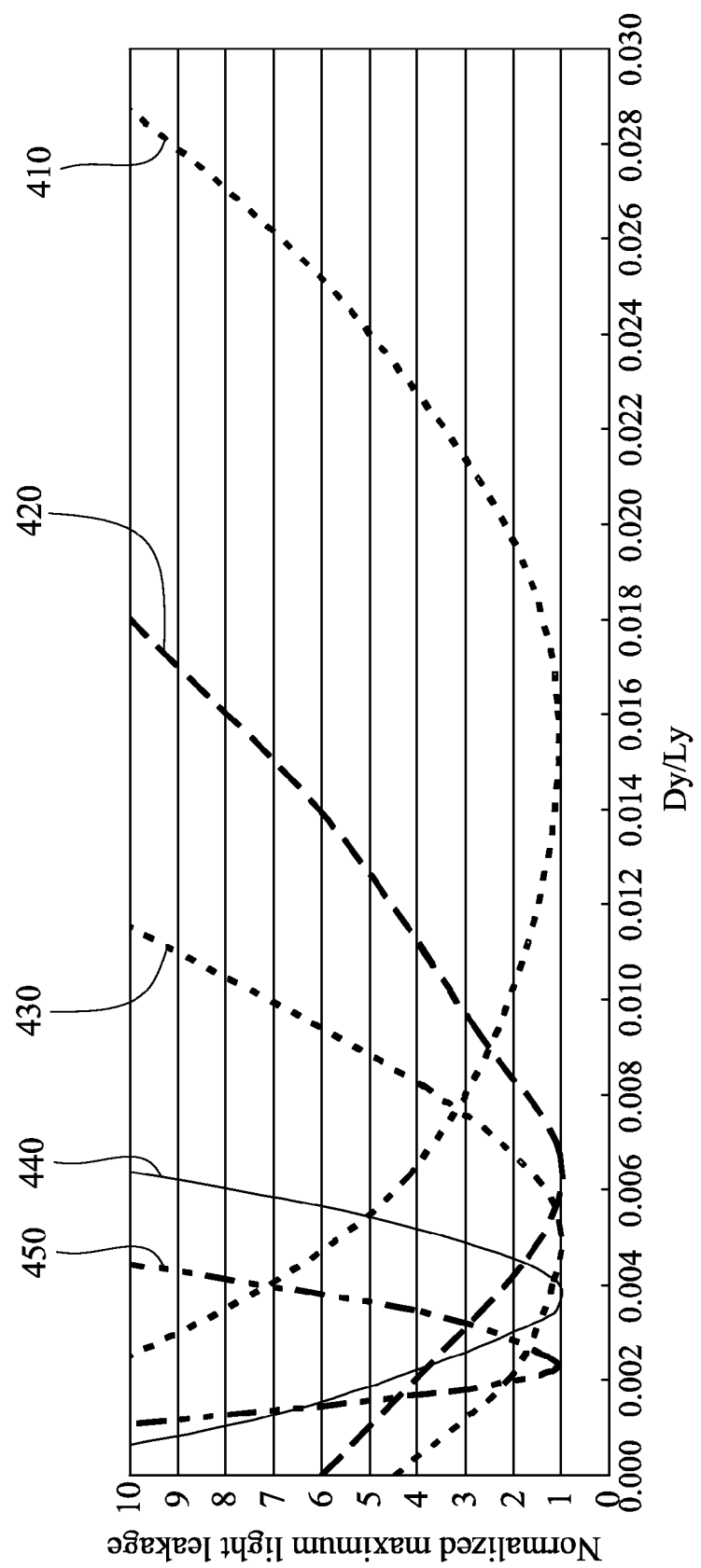
FIG. 5 is a graph illustrating a curvature of the short edges to normalized maximum light leakage curves when the curvature of the long edges of the display device of FIG. 1A is fixed according to different working examples of FIGS. 4A to 4E.

FIG. 5 is a graph illustrating a curvature of the short edges 114 to normalized maximum light leakage curves when the curvature of the long edges 112 of the display device 100 of FIG. 1A is fixed according to different working examples of FIGS. 4A to 4E, in which the curvature of the short edges 114 is represented by the ratio of the maximum deflection Dy and the length Ly of the short edges 114. In addition, the vertical coordinate represents normalized maximum light leakage, and the magnitude of the least normalized maximum light leakage of display device 100 is 1.

As shown in FIG. 5, the curves 410, 420, 430, 440, and 450 are dimensionless. As the radius of the curvature of the long edges 112 becomes smaller (or the curvature Dx/Lx of the long edges 112 becomes larger), the curvature Dy/Ly of the short edges 114 with the least maximum light leakage becomes larger (or the horizontal coordinates of the lowest points of the curves 410, 420, 430, 440, and 450 becomes larger). For example, the radius of the curvature of the long edges 112 for the curve 410 is the smallest (1000 mm) among all curves (or the curvature of the long edges 112 is the largest), such that the curvature of the short edges 114 with the least maximum light leakage is the largest.

Figure 6:
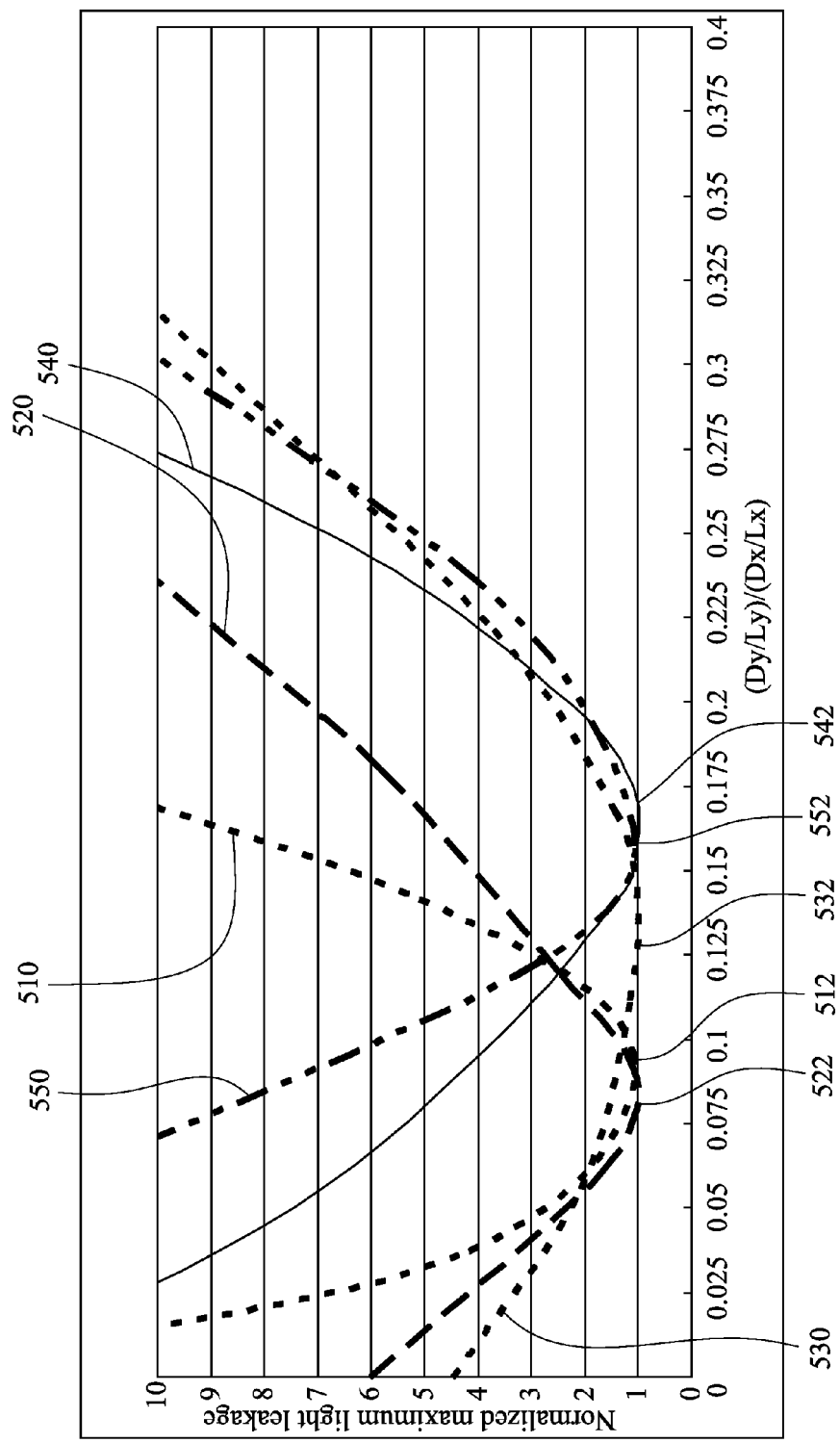
FIG. 6 is a graph illustrating a ratio of curvatures of the short edges and the long edges to normalized maximum light leakage curves when the curvature of the long edges of the display device of FIG. 1A is fixed according to different working examples of FIGS. 4A to 4E.

FIG. 6 is a graph illustrating a ratio of curvatures of the short edges 114 and the long edges 112 to normalized maximum light leakage curves when the curvature of the long edges 112 of the display device 100 of FIG. 1A is fixed according to different working examples of FIGS. 4A to 4E. In FIG. 6, the curvature of the long edges 112 is represented by the ratio of the maximum deflection Dx and the length Lx of the long edges 112, the curvature of the short edges 114 is represented by the ratio of the maximum deflection Dx and the length Lx of the short edges 112, and the ratio of the curvatures of the short edges 114 and the long edges 112 is represented by (Dy/Ly)/(Dx/Lx).

As shown in FIG. 5 and FIG. 6, curves 510, 520, 530, 540 and 550 respectively correspond to the curves 410, 420, 430, 440, and 450. If we take the curve 530 as the reference curve, (Dy/Ly)/(Dx/Lx) with the least maximum light leakage becomes larger as Dx/Lx becomes smaller, and (Dy/Ly)/(Dx/Lx) with the least maximum light leakage reaches its maximum value when Dx/Lx is around 0.165. If Dx/Lx further becomes smaller, (Dy/Ly)/(Dx/Lx) with the least maximum light leakage becomes slightly smaller. Moreover, if we take the curve 530 as the reference curve again, (Dy/Ly)/(Dx/Lx) with the least maximum light leakage becomes smaller as Dx/Lx becomes larger, and (Dy/Ly)/(Dx/Lx) with the least maximum light leakage reaches its minimum value when Dx/Lx is around 0.082.

As shown in FIG. 6, the curves 510, 520, 530, 540, and 550 respectively have their vertices with the least maximum light leakage 512, 522, 532, 542, and 552. If we plot the vertices 512, 522, 532, 542, and 554 in a coordinate system with the horizontal coordinate Dy/Ly and the vertical horizontal coordinate (Dy/Ly)/(Dx/Lx), we can obtain the graph appearing in FIG. 7.

Figure 7:
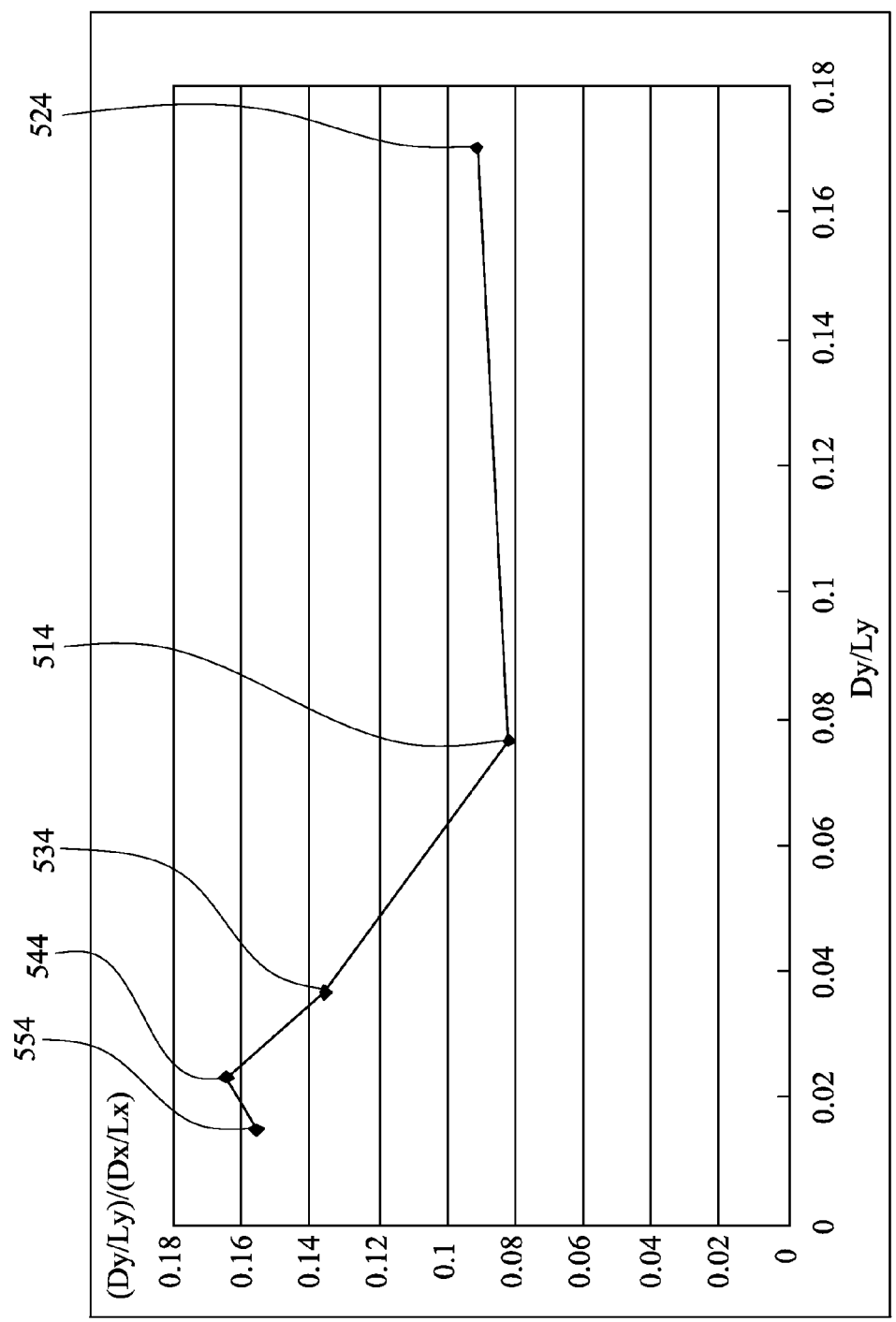
FIG. 7 is a graph illustrating a curvature of the short edges to ratio of curvatures of the short edges and the long edges when the display device of FIG. 1A has the least maximum light leakage according to different working examples of FIG. 6.

FIG. 7 is a graph illustrating a curvature of the short edges 114 to ratio of curvatures of the short edges 114 and the long edges 112 figure when the display device 100 of FIG. 1A has the least maximum light leakage according to different working examples of FIG. 6. The curvature of the short edges 114 is represented by the ratio of the maximum deflection Dy and the length Ly of the short edges 114, and the ratio of the curvatures of the short edges 114 and the long edges 112 is represented by (Dy/Ly)/(Dx/Lx).

As shown in FIG. 6 and FIG. 7, vertices 512, 522, 532, 542, and 552 respectively correspond to points 514, 524, 534, 544, and 554, and the best design range of (Dy/Ly)/(Dx/Lx) is 0.082~0.165.

As shown in FIGS. 4A to 4E, even if there is a 10% error in the best design range, a good improvement effect can still be obtained. Therefore, the design range of (Dy/Ly)/(Dx/Lx) can be 0.074~0.182.

According to the discussion presented above with reference to FIGS. 4A to 4E, when Dy/Ly is in the range from zero to the best design range (but not including zero), the light leakage is lessened. Therefore, when (Dy/Ly)/(Dx/Lx) is in the range from zero to the best design range (but not including zero), the light leakage is lessened. Further, when Dy/Ly is smaller than 3.1 times the maximum value of the best design range (see the discussion related to FIG. 4E), the light leakage is lessened. Moreover, the maximum value of the effective design range of (Dy/Ly)/(Dx/Lx) is about 3.1 times the maximum value of the best design range of (Dy/Ly)/(Dx/Lx), which is 0.165, and the maximum value of the effective design range of (Dy/Ly)/(Dx/Lx) can be 0.512. Therefore, the effective design range of (Dy/Ly)/(Dx/Lx) can be 0~0.512 (but not including zero).

The aforementioned working examples and the associated discussions show that the display device 100 according to different embodiments can indeed lessen mura in a dark state of the display device 100.

By bending the display panel 110 in the first direction 200 and the second direction 300 perpendicular to the first direction 200, the magnitudes of the vertical stress and the horizontal stress in the display panel 110 are made closer to each other. Therefore, the magnitudes of the phase retardations in the vertical direction and the horizontal direction, which are associated with the stress-optical effect, may be about the same, so as to reduce the phase rotation of polarized light passing through the display panel 110. Therefore, leakage of light in a dark state of the display panel 110 due to incomplete filtering of the polarizer is reduced, and mura generated in a dark state of the display panel 110 is lessened.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A display device, comprising:
   a display panel, wherein the display panel is bent in a first direction and a second direction which is perpendicular to the first direction, the display panel has a first long edge and a first short edge, the first long edge has a length Lx and a maximum deflection Dx, the first short edge has a length Ly and a maximum deflection Dy, and the display panel satisfies the following relation:

$0 < (Dy/Ly)/(Dx/Lx) < 0.512$; and a backlight module disposed on one side of the display panel.

2. The display device of claim 1, wherein the display panel is bent toward the backlight module in the first direction and the second direction.

3. The display device of claim 2, wherein the backlight module has a plurality of corner bearing surfaces and a plurality of edge bearing surfaces, and the corner bearing surfaces protrude from the backlight module more than the edge bearing surfaces;
   wherein the display panel further has a second long edge and a second short edge, the first long edge connects the first short edge and the second short edge, the second long edge connects the first short edge and the second short edge, every adjacent two of the first long edge, the first short edge, the second long edge, and the second short edge connecting to each other form a corner, and the corners of the display panel are respectively disposed on the corner bearing surfaces; and the display device further comprises:

a front bezel disposed on one side of the display panel opposite to the backlight module, wherein the front bezel is fixed to the backlight module; and at least one abutment member disposed between the front bezel and the display panel and at least pressing central parts of the first long edge, the first short edge, the second long edge, and the second short edge to force the central parts of the first long edge, the first short edge, the second long edge, and the second short edge to be disposed on the edge bearing surfaces, such that the display panel is bent toward the backlight module in the first direction and the second direction.

4. The display device of claim 3, wherein the backlight module has a concave surface facing the display panel, and the corner bearing surfaces and the edge bearing surfaces are parts of the concave surface.

5. The display device of claim 3, wherein the backlight module has a plane facing the display panel, the edge bearing surfaces are parts of the plane, the backlight module further includes a plurality of convex structures disposed between the plane of the backlight module and the display panel and respectively abutting against the corners of the display panel, and top surfaces of the convex structures abutting against the corners are respectively the corner bearing surfaces.

6. The display device of claim 3, wherein a number of the abutment members is at least two, the abutment members are respectively disposed on the first long edge, the first short edge, the second long edge, and the second short edge, lengths of the first long edge and the second long edge are the same, lengths of the first short edge and the second short edge are the same, a length of the abutment members disposed on the first long edge and the second long edge is smaller than about one third of the length of the first long edge and the second long edge, and a length of the abutment members disposed on the first short edge and the second short edge is smaller than about one third of the length of the first short edge and the second short edge.

7. The display device of claim 1, wherein the display panel further satisfies the following relation:

$0.074 < (D_y/L_y)/(D_x/L_x) < 0.182$.

8. The display device of claim 1, wherein the display panel further satisfies the following relation:

$0.082 < (D_y/L_y)/(D_x/L_x) < 0.165$.

9. The display device of claim 1, wherein the backlight module has a plurality of corner bearing surfaces and a plurality of edge bearing surfaces, and the corner bearing surfaces protrude from the backlight module more than the edge bearing surfaces;

wherein the display panel further has a second long edge and a second short edge, the first long edge connects the first short edge and the second short edge, the second long edge connects the first short edge and the second short edge, every adjacent two of the first long edge, the first short edge, the second long edge, and the second short edge connecting to each other form a corner, and the corners of the display panel are respectively disposed on the corner bearing surfaces; and the display device further comprises:

a front bezel disposed on one side of the display panel opposite to the backlight module, wherein the front bezel is fixed to the backlight module; and at least one abutment member disposed between the front bezel and the display panel and at least pressing central parts of the first long edge, the first short edge, the second long edge, and the second short edge to force the central parts of the first long edge, the first short edge, the second long edge, and the second short edge to be disposed on the edge bearing surfaces, such that the display panel is bent toward the backlight module in the first direction and the second direction.

10. The display device of claim 9, wherein the backlight module has a concave surface facing the display panel, and the corner bearing surfaces and the edge bearing surfaces are parts of the concave surface.

11. The display device of claim 9, wherein the backlight module has a plane facing the display panel, the edge bearing surfaces are parts of the plane, the backlight module further includes a plurality of convex structures disposed between the plane of the backlight module and the display panel and respectively abutting against the corners of the display panel, and top surfaces of the convex structures abutting against the corners are respectively the corner bearing surfaces.

12. The display device of claim 9, wherein a number of the abutment members is at least two, the abutment members are respectively disposed on the first long edge, the first short edge, the second long edge, and the second short edge, lengths of the first long edge and the second long edge are the same, lengths of the first short edge and the second short edge are the same, a length of the abutment members disposed on the first long edge and the second long edge is smaller than about one third of the length of the first long edge and the second long edge, and a length of the abutment members disposed on the first short edge and the second short edge is smaller than about one third of the length of the first short edge and the second short edge.

13. A method for manufacturing a display device, comprising:

providing a display panel and a backlight module; and assembling the display panel on the backlight module, such that the display panel is bent in a first direction and a second direction perpendicular to the first direction, the display panel has a first long edge and a first short edge, the first long edge has a length Lx and a maximum deflection Dx, the first short edge has a length Ly and a maximum deflection Dy, and the display panel satisfies the following relation:

$0 < (D_y/L_y)/(D_x/L_x) < 0.512$.

14. The method of claim 13, wherein the display panel is bent toward the backlight module in the first direction and the second direction.

15. The method of claim 13, wherein the display panel further satisfies the following relation:

$0.074 < (D_y/L_y)/(D_x/L_x) < 0.182$.

16. The method of claim 13, wherein the display panel further satisfies the following relation:

$0.082 < (D_y/L_y)/(D_x/L_x) < 0.165$.

17. The method of claim 13, wherein the backlight module has a plurality of corner bearing surfaces and a plurality of edge bearing surfaces, and the corner bearing surfaces protrude from the backlight module more than the edge bearing surfaces;

wherein the display panel further has a second long edge and a second short edge, the first long edge connects the first short edge and the second short edge, the second long edge connects the first short edge and the second short edge, and every adjacent two of the first long edge, the first short edge, the second long edge, and the second short edge connecting to each other form a corner; and wherein assembling the display panel on the backlight module further comprises:

respectively disposing the corners of the display panel on the corner bearing surfaces;

disposing a front bezel and at least one abutment member on one side of the display panel opposite to the backlight module, wherein the abutment member is disposed between the front bezel and the display panel and on central parts of the first long edge, the first short edge, the second long edge, and the second short edge of the display panel; and fixing the front bezel to the backlight module, such that the abutment member at least presses the central parts of the first long edge, the first short edge, the second long edge, and the second short edge to force the central parts of the first long edge, the first short edge, the second long edge, and the second short edge to be disposed on the edge bearing surfaces and the display panel is bent toward the backlight module in the first direction and the second direction.

* * * * *